United States Patent
von Wedel

(10) Patent No.: US 8,132,520 B2
(45) Date of Patent: Mar. 13, 2012

(54) METHOD AND DEVICE FOR COOLING A LAYER OF BULK MATERIAL ON A CONVEYOR GRATE

(75) Inventor: Karl von Wedel, Neustadt (DE)

(73) Assignee: Alite GmbH, Neustadt (DE)

( * ) Notice: Subject to any disclaimer, the term of this patent is extended or adjusted under 35 U.S.C. 154(b) by 575 days.

(21) Appl. No.: 12/103,572

(22) Filed: Apr. 15, 2008

(65) Prior Publication Data

US 2008/0263888 A1   Oct. 30, 2008

(30) Foreign Application Priority Data

Apr. 25, 2007  (DE) .................. 10 2007 019 530

(51) Int. Cl.
*F27D 15/02* (2006.01)
*F27B 5/00* (2006.01)
(52) U.S. Cl. ............ 110/281; 110/328; 198/750.2
(58) Field of Classification Search ........... 198/750.2, 198/750; 110/281, 282, 284, 328; 34/236
See application file for complete search history.

(56) References Cited

U.S. PATENT DOCUMENTS

| | | | | |
|---|---|---|---|---|
| 4,563,959 A * | 1/1986 | Fujiwara | ............... | 110/281 |
| 4,600,380 A | 7/1986 | von Wedel | | |
| 4,870,913 A * | 10/1989 | Schneider | ............... | 110/299 |
| 4,966,548 A * | 10/1990 | von Wedel | ............... | 432/77 |
| 5,299,555 A | 4/1994 | Claes | | |
| 5,482,155 A * | 1/1996 | Foster | ............... | 198/750.2 |
| 5,862,906 A * | 1/1999 | Von Wedel | ............... | 198/750.1 |
| 5,882,189 A * | 3/1999 | Fehsenmayr et al. | ........ | 432/78 |
| 5,901,460 A | 5/1999 | Carter et al. | | |
| 5,947,719 A * | 9/1999 | Heinemann et al. | ........ | 432/78 |
| 5,992,334 A * | 11/1999 | von Wedel | ............... | 110/300 |
| 6,036,483 A * | 3/2000 | Meyer et al. | ............... | 432/45 |
| 6,266,883 B1 * | 7/2001 | Heinemann et al. | ...... | 29/896.6 |
| 6,290,493 B1 * | 9/2001 | Pirard et al. | ............... | 432/77 |
| 6,343,557 B1 * | 2/2002 | Rosvold | ............... | 110/267 |
| 6,378,447 B1 * | 4/2002 | Martin et al. | ............... | 110/328 |
| 6,745,893 B2 | 6/2004 | von Wedel | | |

(Continued)

FOREIGN PATENT DOCUMENTS

AT         85354         8/1921

(Continued)

OTHER PUBLICATIONS von Wedel, Clinker Cooling with Coanda Effect, Zement, Kalk, Gips, Apr. 1992, p. 1-14, Neustadt, Germany.

*Primary Examiner* — Douglas A Hess
(74) *Attorney, Agent, or Firm* — Quarles & Brady LLP

(57) ABSTRACT

A conveyor grate for the transport and cooling of bulk material, for example cement clinker, comprises a grate floor having multiple planks (12), adjacently situated transverse to the direction of transport on associated support structures and operationally moved longitudinally relative to one another individually or in groups, with moving gaps (14) designed as blow openings situated therebetween, and a method for operating such a conveyor grate. The mutually facing side edges or side edge regions of two adjacent planks (12) form two complementary, mutually engaging profiles between which the moving gap (14) is formed. In the method according to the invention, at least a quantity of the cooling air is blown through the moving gaps (14) which is sufficient to blow the moving gaps (14) completely open.

31 Claims, 3 Drawing Sheets

U.S. PATENT DOCUMENTS

| | | | |
|---|---|---|---|
| 6,769,533 B2 * | 8/2004 | Suer ............................ | 198/773 |
| 6,926,521 B2 * | 8/2005 | Meyer et al. ................. | 432/78 |
| 6,938,563 B2 * | 9/2005 | Martin et al. ................ | 110/327 |
| 7,114,612 B2 | 10/2006 | Meyer et al. | |
| 7,146,916 B2 * | 12/2006 | Beaumont et al. .......... | 110/300 |
| 7,156,223 B2 | 1/2007 | Meyer et al. | |
| 7,219,610 B2 * | 5/2007 | von Wedel ................... | 110/298 |
| 7,395,917 B2 * | 7/2008 | Meyer et al. ................ | 198/750.2 |

FOREIGN PATENT DOCUMENTS

| | | |
|---|---|---|
| DE | 10118440 | 10/2002 |
| DK | 9901403 | 4/2001 |
| EP | 0549816 | 7/1993 |
| EP | 1475594 | 11/2004 |

* cited by examiner

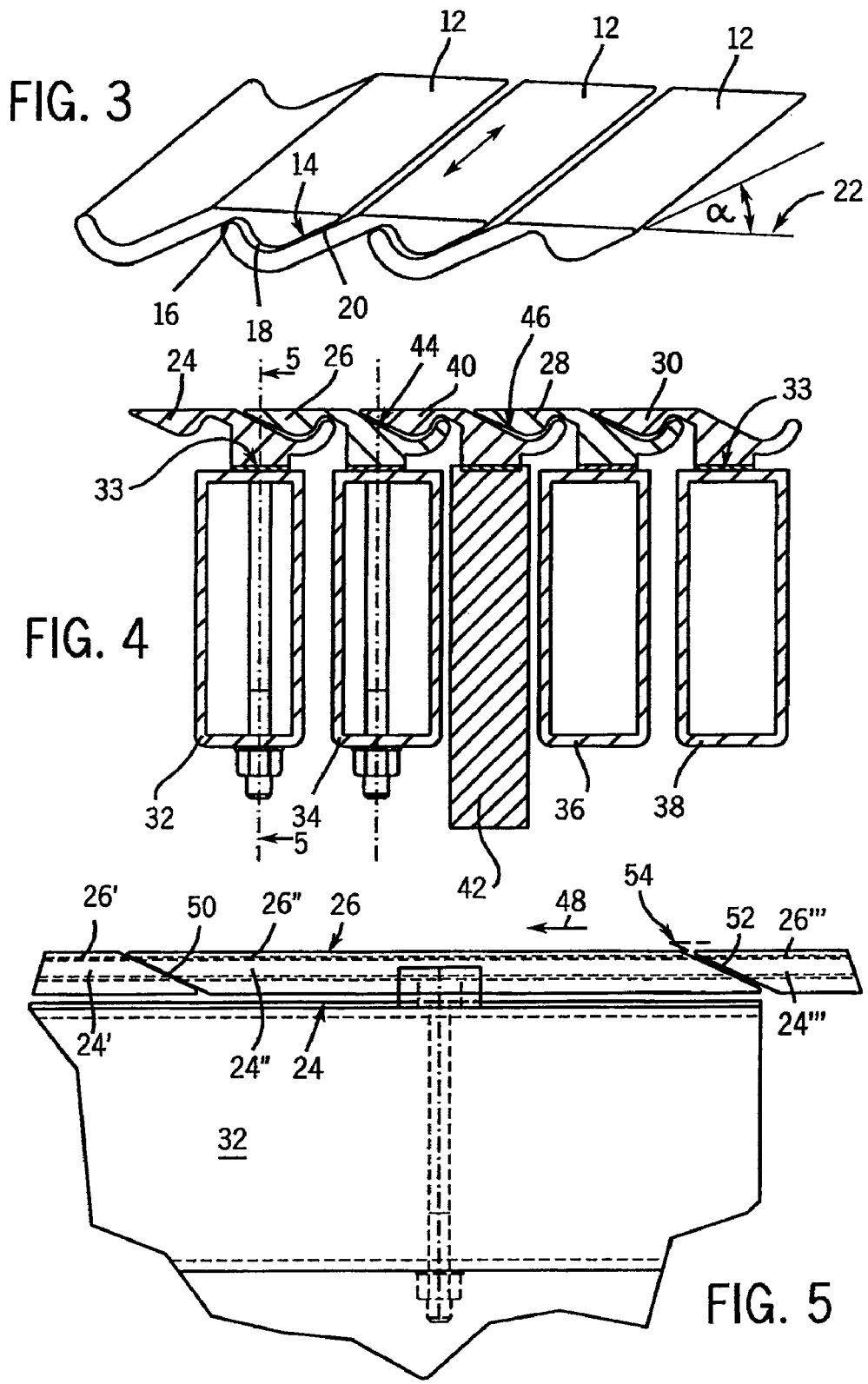

METHOD AND DEVICE FOR COOLING A LAYER OF BULK MATERIAL ON A CONVEYOR GRATE

CROSS REFERENCES TO RELATED APPLICATIONS

This application claims priority to German Patent Application No. 10 2007 019 530.5-24 filed on Apr. 25, 2007, which is fully incorporated herein.

STATEMENT REGARDING FEDERALLY SPONSORED RESEARCH

Not Applicable

1. Technical Field

The invention relates to a method and a device for cooling a layer of bulk material resting on a conveyor grate by means of cooling air blown through the grate floor, the grate floor being formed by multiple planks adjacently positioned transverse to the direction of transport and longitudinally moved relative to one another, with moving gaps situated therebetween which allow cooling air to pass through.

2. Description of the Background Art

Conveyor grates of the type described above have been implemented in various designs. The planks with the bulk material resting thereon are moved back and forth, individually or as a group, according to a specified motion pattern in such a way that a net forward motion of the bulk material results in the direction of transport. The bulk material is generally cooled via blower openings, provided in the planks, through which cooling air conducted in cooling air channels or open chambers beneath the grate floor is blown into the bulk material located thereabove.

A special design problem is posed by the moving gaps between the planks moved relative to one another, which must be designed in such a way that they prevent material from falling through.

A conveyor grate of the aforementioned type is known from EP 1 475 594 A1, in which beneath each moving gap a channel is provided which collects bulk material which falls through the moving gap. The side walls of the channel together with the underside of a vertical strip or side flank situated on each plank form a narrow labyrinth through which bulk material cannot pass, thus preventing material from falling through the grate into the chamber beneath the grate floor. The aim of this design measure is to seal off the moving gap between adjacent planks, on the one hand against material falling through the grate from above, and on the other hand against gas ascending from below (page 3, lines 25ff.).

A disadvantage of the known design is that the moving gaps are relatively wide due to the labyrinth structures provided therein, thus forming bulk material pathways which are not ventilated through the labyrinth structures and do not take part in the transport process, thereby impairing the transport efficiency of the conveyor grate. To achieve a satisfactory ratio of conveying to nonconveying conveyor grate floor surface areas, the planks must likewise have a relatively wide design. After the transport motion is stopped, bulk material remains on the planks in the approximate shape of a roof. The quantity of bulk material depends on the roof height, which depends on the width of the planks, taking into consideration the specified slope angle of the bulk material. In other words, the wider the planks, the greater the quantity of bulk material remaining on the planks. After the conveyor grate is emptied, the total quantity of bulk material remaining on the planks and above the moving gaps is large, and before inspections and repairs must be removed from the grate floor, either manually or using special tools. A further disadvantage of the known conveyor grate is that the drive power required is increased considerably as the result of the friction between the bulk material falling into the moving gaps and the surfaces of the labyrinths. In practice, the above-described relationship between the width of the seals and the width of the planks has dictated operation with particularly high layers of bulk material, which requires correspondingly high drive and ventilation power.

Danish Patent DK 1 999 014 03 discloses a conveyor grate of the type mentioned at the outset, in which the moving gaps also allow cooling air to pass through. In this case as well, labyrinth structures are provided in the wide moving gaps which are designed to prevent bulk material from falling into the chamber beneath the grate floor. These labyrinth structures are formed by two mutually engaging angled profiles in such a way that the progression of the moving gap has a somewhat meandering cross section. It is readily recognized by one skilled in this field that here as well, at least the coarse-particle fraction of the bulk material falls into the moving gap up to the channel formed by the lower angled profile, and is prevented from falling into the chamber beneath the grate floor only by the adjacent ascending section of the labyrinth progression. Only the fine particle fraction of the bulk material is exhausted upward by the air flow which still passes through the coarse-particle bulk material. Consequently, on page 2, line 24 the cited document states that the two sealing sections form a "dust seal." Due to the imprecisely defined nature and quantity of bulk material present in the moving gap, the ventilation through the moving gaps remains uncontrolled and indeterminate. In other respects, the design described in the Danish patent essentially corresponds to the design of EP 1 475 594 A1 with respect to function, and therefore also has the disadvantages described in conjunction with this document, in particular with regard to the high drive and ventilation power.

SUMMARY OF THE INVENTION

The object of the invention is to provide a conveyor grate, having a simple design and which may be easily manufactured and installed, and which allows the moving gap and thus also the planks to have a narrow design compared to the known approaches according to the prior art, so that the quantity of bulk material which does not take part in the transport or which remains after emptying of the conveyor grate is minimized, thereby improving the degree of emptying.

A further object of the invention is to provide a method for cooling bulk material in such a way that frictional losses in the moving gap are avoided, thereby improving the drive efficiency.

The invention is based on the finding that the design, known from EP-A-0 167 658 and EP 0 549 816 B2, for example, of blower slots formed between profiled slats which prevent material from falling through may also be advantageously used for the design of moving gaps between planks moved relative to one another.

Therefore, the invention is directed to a conveyor grate for conveying and cooling bulk material, comprising a grate floor having multiple planks, adjacently situated transverse to the direction of transport on associated support structures and operationally moved longitudinally relative to one another individually or in groups, with moving gaps situated therebetween which allow cooling air to pass through. According to the invention, the mutually facing side edges or side edge regions of two planks longitudinally moved relative to one another form two mutually complementary profiles, between which a narrow moving gap is formed.

Even complex, complementary mutually engaging gap profiles may be produced by appropriate profiling of the particular side edges or side edge regions. The planks are produced, for example, by precise casting or drawing processes. When the planks are installed on the associated support structures, at the same time and without additional installation effort the moving gaps are easily formed, which may have a wider or narrower design as desired, thereby restricting coarser particles by merely mechanical means.

Furthermore, by suitable shaping of the moving gaps the moving gaps prevent material, even fine-particle material, from falling through the grate, even in stationary operation, i.e., in an operating phase without air blowing. For this purpose, according to one preferred design of the invention the moving gaps each have a siphon-like curvature having at least one upwardly directed inlet section, one adjacent downwardly directed intermediate section, and one adjacent upwardly directed outlet section. The downwardly directed intermediate section for the cooling air forms an upwardly directed section for any bulk material particles penetrating the moving gap, and forms an effective obstacle to falling through the grate.

In a further design of the invention, the moving gaps emerge at an acute angle inclined with respect to the grate floor surface. At the same exhaust velocity, the air outlet from an obliquely upwardly guided gap represents a more effective obstacle to the penetration of bulk material than a perpendicular gap, which is protected from penetration by bulk material only from blown cooling air.

The exit angle of the moving gaps is preferably selected such that the exiting cooling air lies against the grate floor surface as a result of the Coanda effect. The cooling air in horizontal contact with the surface of the grate floor effectively keeps fine particles which may be moved by air flow, in particular in the interstices of the bulk material, away from the moving gap.

To prevent in particular the fine-particle fraction of the bulk material from migrating toward the edge of the grate floor, according to a further design of the invention the blowing direction for the moving gaps in each case extends from the edge of the grate floor toward the middle of the grate floor.

The width of the moving gaps is preferably selected and coordinated with the width of the planks in such a way that in any case the moving gaps do not close during thermal expansion of the planks in the transverse direction, and that the possible narrowing may be compensated for by a corresponding, preferably automatic, increase in power of the cooling air fans. The power of the cooling air fans is accordingly adjusted in any operating phase so that the proportion of cooling air desired for blowing cooling air through the moving gaps is obtained.

Various approaches may be used for the design of the support structure. According to one design, each plank is attached to the support structure by a side member which supports the plank along its entire length and forms the second plane beneath the planks. In other words, a number of side members which corresponds to the number of planks is provided which may be movably or stationarily supported on cross members situated transverse to the direction of transport.

To prevent the support structure which supports the planks from being excessively heated, according to a further design of the invention the planks are connected to the support structures which support the planks via heat-insulating elements.

In another design of the support structure, the planks are supported on multiple cross members which are successively positioned in the longitudinal direction and form the second plane. Such a design allows the number of supports in the second plane to be kept smaller than the number of planks. The design also allows better access to the underside of the grate for maintenance or repairs, for example.

The planks themselves may be designed as one piece and may extend over the entire length of the grate floor. In one preferred design, however, the planks are composed of multiple plank sections which are successively positioned in the longitudinal direction and connected to one another. This design allows the length of the grate floor to have any given design, depending on the grid size of the plank sections. The plank sections should preferably abut one another via butt joints which slope forward from bottom to top. When the plank sections undergo elongation as the result of thermal expansion, the respective rear plank section moves forward and upward relative to the front plank section, and forms a small step which assists in entrainment of the transported material by the plank.

The dimensions of the moving gap are precisely matched to the sealing function on the one hand and to the cooling function on the other hand, and remain substantially unchanged even during long operating periods of the conveyor grate. To prevent alteration of the gap geometry as the result of wear in the bearing of the moved planks, according to a further design of the invention the movable support structures which support the planks are borne by wear-free linear guides according to the known principle of oscillating torsion bars (DE 10 118 440).

The invention is further directed to a method for cooling a layer of bulk material resting on a conveyor grate by means of cooling air blown through the grate floor, the grate floor being formed by multiple planks adjacently positioned transverse to the direction of transport and longitudinally moved relative to one another, with moving gaps situated therebetween which allow cooling air to pass through. According to the invention, a defined quantity of cooling air which may be precisely specified by the gap cross section that is free of bulk material and by the pressure difference over the gap is blown out which is at least sufficient to blow the moving gaps completely open. By providing the moving gaps with a narrow design, for coarser bulk material, i.e., bulk material having a particle size greater than the gap width, the moving gaps per se form an absolute obstacle to material falling through. Finer bulk material which may reach the moving gap may easily be blown out completely by a correspondingly dimensioned quantity of cooling air introduced through the moving gaps, thereby achieving a complete seal against material falling through the grate. Since in a moving gap free of bulk material no friction occurs which can hinder the plank movement, the drive power may also be reduced compared to the known approaches. Because all of the ventilation gaps are at the same time moving gaps, the moving gaps are continuously kept clean.

According to one preferred design of the method according to the invention, it is also provided that at least a predominant portion of the entire quantity of cooling air is blown through the moving gaps. A method with discharge of cooling air through the moving gaps has been described in Danish Patent DK 1 999 014 03 cited above. In this known method, however, it is assumed that at least coarser bulk material passes into the moving gaps, so that only an imprecisely defined quantity of cooling air which is sufficient to blow free a proportion of particles of the bulk material is able to pass through the moving gap filled with coarse-particle bulk material. The majority of the cooling air is blown into the openings provided in the planks.

In contrast, according to the present invention at least a predominant portion of the cooling air is blown through the moving gaps in such a way that the moving gaps are blown completely open. Any remaining portion of the cooling air may be blown, for example through the blowing slots extending transverse to the direction of transport, for example according to the above-cited EP-A-0 167 658 or EP 0 549 816 B2, or through other suitable openings which prevent material from falling through. In the limiting case the predominant portion of the cooling air may be as great as the entire portion, in which case additional blow openings in the planks are omitted. One particular advantage of the cooling air being blown through the moving gaps which are free of obstacles is that the grate resistance for the cooling air is constant, and the air flow remains defined. Falling of material through the grate is prevented more reliably than with labyrinths filled with bulk material.

Karl von Wedel (Zement, Kalk, Gips [Cement, Lime, Gypsum] April 1992, pages 171ff.) has shown that when Coanda blow openings are used, a so-called "open" grate surface area of 2.5% of the total grate surface area is useful, and provides optimal results with regard to the air distribution for highly packed bulk material beds. For the limiting case that all or almost all of the cooling air is blown through the moving gaps, a design ratio of 2.5:100 for the width of the moving gaps to the plank widths results, or for a projected plank width of 75 mm, results in a moving gap width of approximately 2 mm.

The cooling air introduced through the moving gaps is preferably blown out at an acute angle inclined with respect to the grate floor surface, and preferably in each case from the edge of the grate floor toward the middle of the grate floor, as previously described.

BRIEF DESCRIPTION OF THE DRAWINGS

The invention is explained in greater detail below by use of several embodiments, with reference to the accompanying drawings which show the following:

FIG. 3 shows a perspective view of multiple successively positioned planks of a grate floor;

FIG. 4 shows a partial cross section of a conveyor grate in which each plank is attached to an associated side member;

FIG. 5 shows a partial longitudinal section of a configuration according to FIG. 4 along section line V-V;

DETAILED DESCRIPTION OF THE PREFERRED EMBODIMENTS

Figure 1:
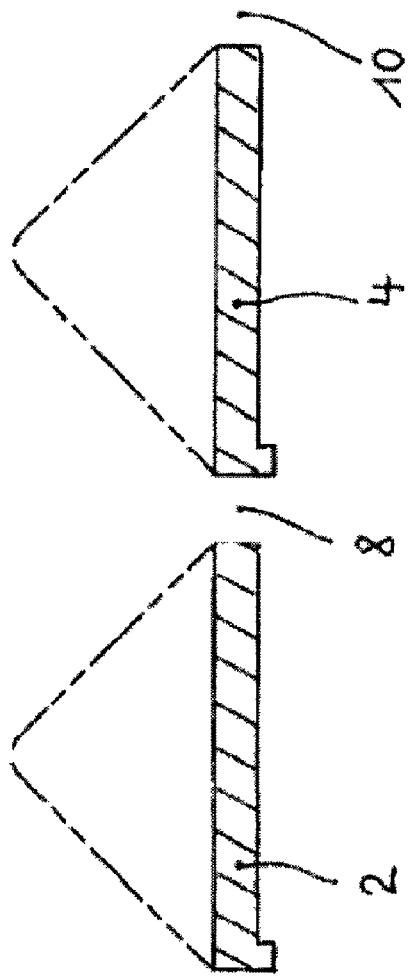
FIG. 1 schematically shows a partial cross section of a conventional grate floor.

FIG. 1 schematically shows three adjacently positioned planks 2, 4, 6 of a conventional conveyor grate with moving gaps 8, 10 situated therebetween. The moving gaps 8, 10 have a relatively wide design to accommodate the labyrinth structures, not illustrated in the figure for improved clarity, which prevent bulk material from falling into a chamber located beneath the planks 2, 4, 6. As described above, the moving gaps 8, 10 become filled with bulk material. The area above the moving gaps 8, 10 does not take part in the ventilation. To achieve a specified desired ratio of the surface area of the planks taking part in the ventilation to the surface area of the moving gaps not taking part in the ventilation, the planks 2, 4, 6 must have a relatively wide design. As previously described, an open grate surface area of, for example, 2.5% of the total grate surface area is sought, whereby in the conventional grate illustrated in FIG. 1 the blow openings must be distributed on the plank surface since the moving gaps are not available as blow openings. As shown in FIG. 1, after the conveyor grate is stopped, cones of bulk material remain on the planks 2, 4, 6 whose height depends on the respective cone base width and the natural slope angle of the bulk material. In other words, the wider the planks, the higher the bulk material cone, and the greater the quantity of bulk material remaining on the conveyor grate after it is stopped, which must then be removed occasionally by hand or by other equipment.

Figure 2:
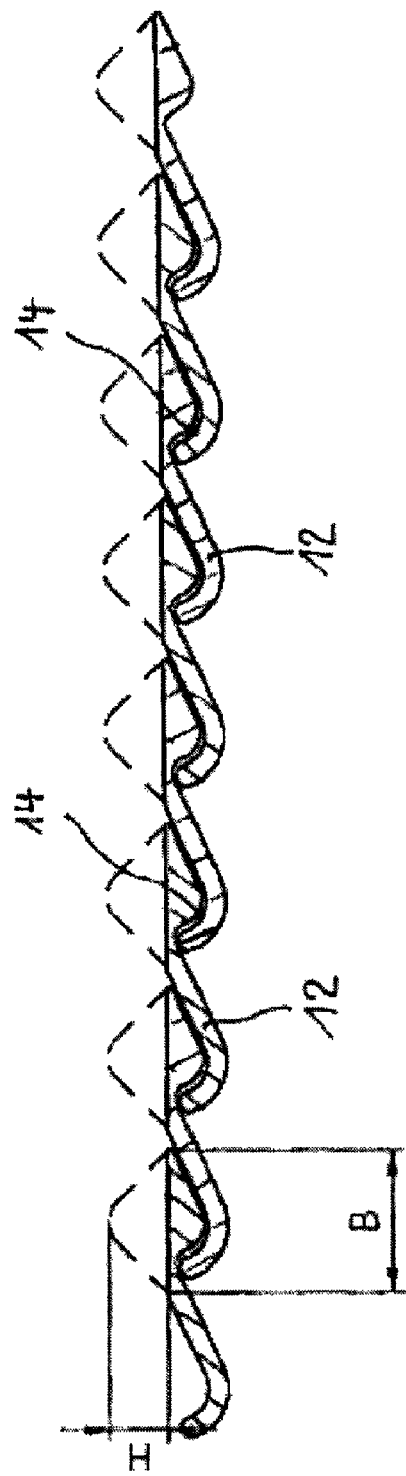
FIG. 2 schematically shows a partial cross section of a grate floor according to the present invention.

FIG. 2 schematically shows a partial cross section of a grate floor according to the present invention, in which the mutually facing side edges or side edge regions of two adjacent planks 12 in each case form two complementary, mutually engaging profiles, between which a moving gap 14 is formed. As shown in particular in FIG. 3, the moving gaps 14 each have a siphon-like curvature having, from bottom to top, an upwardly directed inlet section 16, an adjacent downwardly directed intermediate section 18, and an adjacent upwardly directed outlet section 20.

As also shown in particular in FIG. 3, the moving gaps 14 emerge at an acute angle $\alpha$ inclined with respect to the grate floor surface 22. The exit angle $\alpha$ of the moving gaps 14 is selected such that the exiting cooling air lies against the grate floor surface 22 as a result of the Coanda effect.

The width of the moving gaps 14 is designed and matched to the width of the planks 12 in such a way that in any case the moving gaps do not close during thermal expansion of the planks in the transverse direction, and also remain within a range which may be compensated for by controlling the cooling air fans. Assuming a gap width in the outlet section 20 of 1-3 mm, in this case approximately 2 mm, for example, which is specified by the particle size of the bulk material which may still be reliably blown out, and with the assumption that the entire quantity of cooling air is blown through the moving gaps, for a sought open grate surface area of 2.5% a plank width of approximately 80 mm results. Of course, the relationships stated here by way of example change when an increasing proportion of the cooling air is blown through the blow openings provided in the planks; i.e., from a ventilation standpoint the planks become wider. From a transport standpoint this is disadvantageous because the bulk material cones become higher.

It may be shown that for an exit angle $\alpha$ of 35°, a moving gap having a gap width of 3 mm in the cold state of the grate is narrowed to 2.4 mm when heated by 500° C. The required pressure increase at the inlet of the gap is in a range that is within the customary control range of the cooling air fans.

As further shown in FIG. 2, the effective width B of the planks 12 may be kept significantly narrower than in the example of FIG. 1, so that the height H of the bulk material cones, and thus the quantity of bulk material remaining after the conveyor grate is stopped, is much less; in addition, bulk material cones cease to fall through the moving gaps, since the latter are continuously blown completely open. A comparison of FIGS. 1 and 2 shows that when the effective width 3B of the conventional planks 2, 4, 6 is three times that of the planks 12, the quantity of bulk material remaining on the former is theoretically nine times as great.

Tests under conditions selected to be relatively unfavorable, i.e., with sharp-edged stone chips as bulk material, side walls of wood with relatively high friction, and smooth metal planks with relatively low friction, gave the following results:

As a motion pattern for the plank movement, it was specified that all planks simultaneously move in the direction of transport and individually move in the reverse direction. It has been shown that complete transport in the forward direction is still achieved when the bed height H is not greater than the total bed height B, i.e., $$H \leq 0.35 \cdot B.$$

The wall friction and plank friction are approximately equal, and the entire bed is transported. For a bed height of H>0.35 B the bed is decelerated as the result of wall friction.

A critical limiting bed height of approximately 600 mm, i.e., which is technically feasible for ventilation, results in a minimum bed width B=H/0.35=600/0.35=1715 mm. In practice, the bed width of conveyor grates is much greater, so that a bed with a bed height of 600 mm in any case is easily transported forward, since the wall friction is significantly lower than the plank friction.

The observed relationship between the bed height and the width of the moved planks also applies for the return stroke. For a plank width b, as a first approximation the bed height transported backward is h≈0.35 b. When the entire grate width or bed width B is divided over n planks, the following applies: b=1/n·B, from which is derived $$h \approx 1/n \cdot 0.35\ B,$$

i.e., the bed height for the return stroke is smaller than for transport in the forward direction by a factor of 1/n. From a transport standpoint this gives an incentive to provide the planks with a narrow design.

In addition to the friction at the side walls, in the return stroke there is also the friction with the resting bulk material located above and adjacent to the bulk material which is transported backward. This additional friction further reduces the quantity of bulk material that is transported backward.

Thus, from a transport standpoint, for a given plank width there is an incentive to set the bulk material bed moved in the direction of transport higher so that it corresponds to this plank width according to the relationships described above. Bed heights greater than 800 mm with a plank width of 600 mm are known from the relevant literature (Cement International No. February 2000: Operating experiences with the Claudius Peters ETA clinker cooler in the Siggenthal works of Holcim Switzerland). From a ventilation standpoint, however, for other grate floors a bed height of 600 mm has proven to be advantageous, as mentioned above. For this bed height, plank widths of less than 600 mm would be necessary, and when additional factors are included, plank widths of much less than 600 mm would be desirable.

FIG. 4 shows a partial cross section of a conveyor grate in which each moved plank 24, 26, 28, 30 is attached to a respective side member 32, 34, 36, 38 which supports the plank along its entire length. The side members are connected, in a manner not illustrated further, to a drive device for the longitudinal movement of the planks.

The middle plank 40 in FIG. 4 represents a stationary plank which is fixedly connected to the grate floor structure 42. As shown in FIG. 4, a moving gap 44 or 46 is also formed between the stationary plank 40 and the respective plank 26 or 28 adjacent thereto.

FIG. 5 shows a longitudinal section along section line V-V in FIG. 4. It is seen that planks 24 and 26 are composed of plank sections 24', 24", 24''' and 26', 26", 26''', respectively.

The plank sections are connected to one another in a manner not further illustrated, and via heat-insulating elements denoted by reference numeral 33 in FIG. 4 are connected to the support structures which support the plank sections. The plank sections abut one another via butt joints 50 or 52 which slope forward from bottom to top, i.e., oriented in the direction of transport 48. The connection of the plank sections is designed in such a way that the plank sections may be moved relative to one another at the butt joints 50 or 52. Each rear plank section, for example 24''', with respect to the plank section 24" in front thus forms a step 54 which does not have a detrimental effect, but, rather, causes the bulk material to be entrained during the advancing motion, and in the return stroke subjects at least the lower layer of the bulk material to a slight falling motion which is propagated in the bulk material bed, thus assisting in particle sorting by discharging the fine particles which can be moved by ventilation.

As previously described, at least a quantity of cooling air is blown through the moving gaps 14 which is sufficient to blow the moving gaps completely open. It is preferable for the predominant portion, up to the total portion, of the provided quantity of cooling air to be introduced through the moving gaps.

Figure 6:
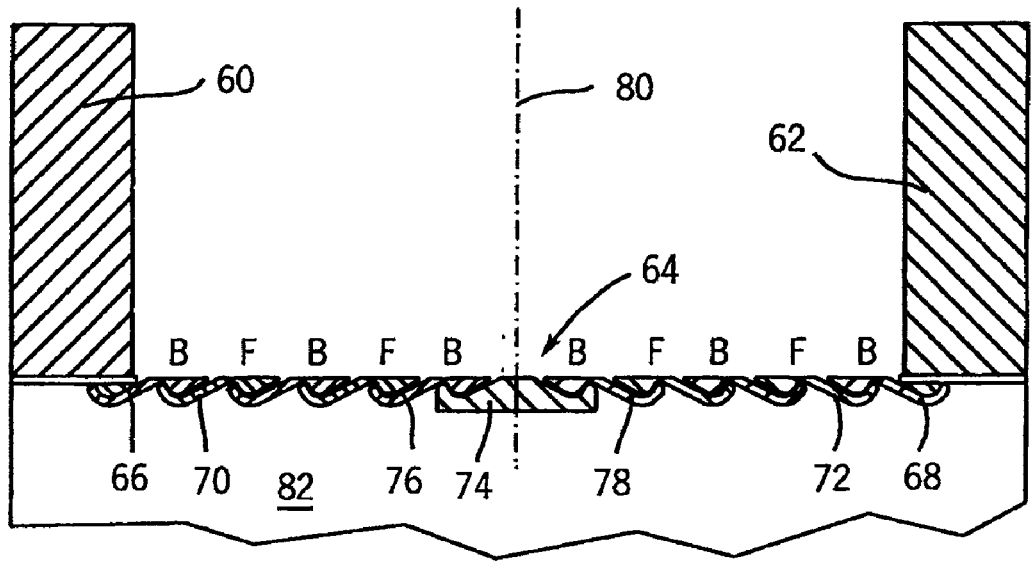
FIG. 6 schematically shows a cross section of a grate floor.

FIG. 6 shows a schematic cross section of a grate floor 64 situated between two stationary side walls 60, 62. Associated with each of the side walls 60 or 62 is an edge plank 66 or 68, respectively, which is fixedly connected to the side wall and sealed with respect to same, and which forms a moving gap together with the respective plank 70 or 72 adjoining toward the middle of the grate floor. These planks 70 or 72 are longitudinally movable planks, for example, which adjoin movable planks B and fixed planks F, for example, toward the middle of the grate floor, and which likewise form moving gaps with one another as previously described. A fixed center plank 74 is provided in the middle of the grate floor, which together with the respective adjacent inner movable plank 76 or 78 likewise forms a moving gap.

As shown in FIG. 6, the moving gaps in the right side of the grate floor and in the left side of the grate floor in FIG. 6 are each oriented with respect to the center plane 80, as previously described.

FIG. 6 shows an example of a conveyor grate in which the entire quantity of cooling air is blown through the moving gaps connected to the air box 82 located beneath the grate floor, the open grate surface area being determined by the ratio of the gap surface area to the total surface area of the grate floor, likewise previously described.

Figure 7:
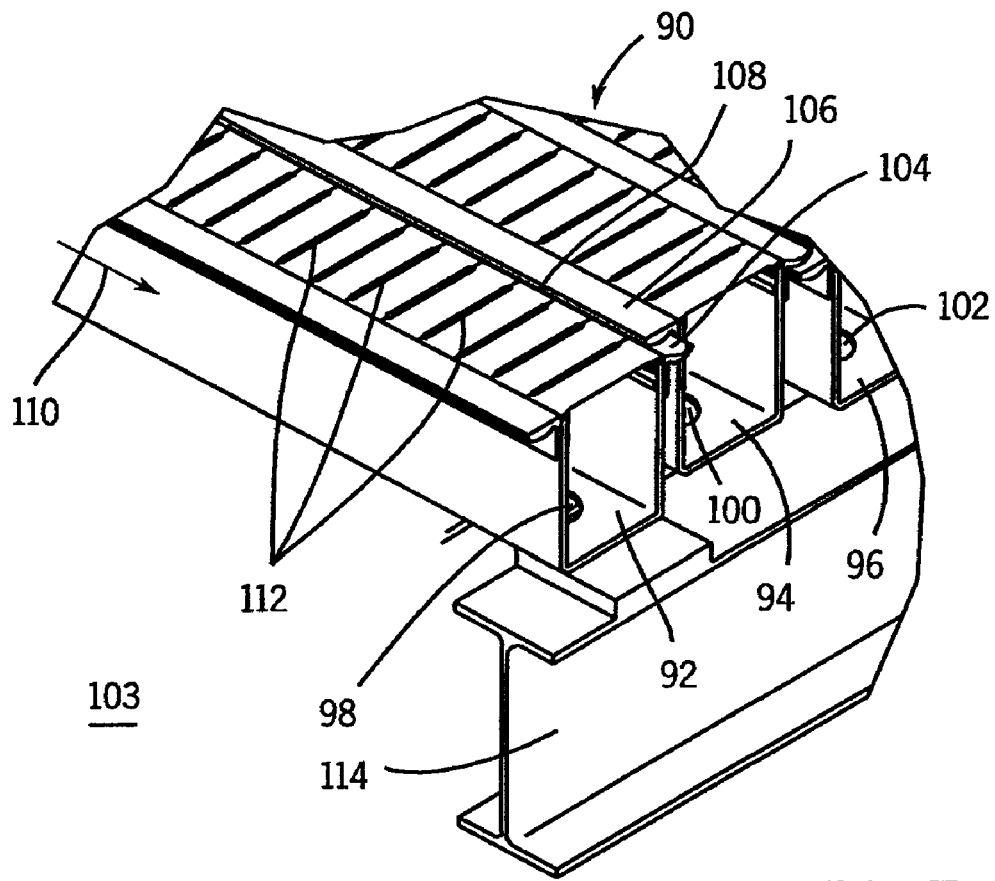
FIG. 7 shows a perspective partial illustration of planks designed as boxes having transverse slots.

FIG. 7 shows an example of a grate floor 90 in which the planks 92, 94, 96 which are movable relative to one another are each designed as elongated boxes, which via openings 98, 100, 102 provided in the floor are connected to an air box or air chamber 103 located beneath the grate floor. Situated at the mutually facing upper side edges of the boxes are complementary, mutually engaging profiles 104, 106, between which a moving gap 108 is provided. A predetermined, defined portion of cooling air is blown through the moving gaps.

In addition to the moving gaps 108 used as blow openings, blowing slots 112 approximately according to previously cited EP 0 549 816 B2 are provided at the upper side of the boxes, transverse to the direction of transport indicated by the arrow 110, through which the remaining portion of the cooling air is blown.

FIG. 7 also shows an example in which the planks 92-96, in this case designed as rigid boxes, are supported on cross members, of which one cross member 114 is illustrated.

The invention claimed is:

1. A conveyor grate for the transport and cooling of bulk material, said conveyor grate comprising a grate floor having multiple planks forming an essentially plane grate floor surface, the planks being adjacently situated transverse to the direction of transport on an associated support structure and operationally moved longitudinally relative to one another individually or in groups, with moving gaps situated therebetween which allow cooling air to pass through, wherein mutually facing side edges or side edge regions of two adjacent planks form two essentially mutually complementary profiles between which the moving gap is formed.

2. The conveyor grate according to claim 1, in which the moving gaps each have a siphon-like curvature having at least one upwardly directed inlet section, one adjacent downwardly directed intermediate section, and one adjacent upwardly directed outlet section.

3. The conveyor grate according to claim 1, in which the moving gaps emerge at an acute angle $\alpha$ inclined with respect to the grate floor surface.

4. The conveyor grate according to claim 3, in which the acute angle $\alpha$ of the moving gaps is selected such that the exiting cooling air lies against the grate floor surface as a result of the Coanda effect.

5. The conveyor grate according to claim 3, in which the moving gaps have an outlet direction, which extends from the edge of the grate floor toward the middle of the grate floor.

6. The conveyor grate according claim 1, in which the width of the moving gaps is selected and coordinated with the width of the planks in such a way that a narrowing which occurs during thermal expansion of the planks in the transverse direction may continuously be compensated for by increasing the power of cooling air fans.

7. The conveyor grate according claim 1, in which each plank is attached to a side member which supports the plank along its entire length.

8. The conveyor grate according to claim 1, in which the planks are supported on multiple cross members which are successively positioned in the longitudinal direction.

9. The conveyor grate according to claim 1, in which the planks are composed of multiple plank sections which are successively positioned in the longitudinal direction and connected to one another.

10. The conveyor grate according to claim 9, in which the plank sections abut one another via butt joints which slope forward from bottom to top.

11. The conveyor grate according to claim 1, in which the planks are connected via heat-insulating elements to the support structures which support the planks.

12. The conveyor grate according to claim 1, in which the movable support structures which support the planks are borne by wear-free linear guides comprising oscillating torsion bars.

13. A method for cooling a layer of bulk material resting on a conveyor grate, said method comprising:
blowing cooling air through the grate floor, the grate floor being formed by multiple planks thereby providing an essentially plane grate floor surface and being adjacently positioned transverse to the direction of transport and operationally moved longitudinally relative to one another, with moving gaps situated therebetween, at least a portion of the cooling air being blown through the moving gaps, wherein at least a quantity of the cooling air is blown through the moving gaps which is sufficient to blow the moving gaps completely open.

14. The method according to claim 13, in which the predominant portion of the entire provided quantity of cooling air is blown through the moving gaps.

15. The method according to claim 14, in which the cooling air introduced through the moving gaps is blown out at an acute angle $\alpha$ inclined with respect to the grate floor surface.

16. The method according to claim 15, in which the cooling air is blown out from each moving gap in each case toward the middle of the grate floor.

17. A conveyor grate for the transport and cooling of bulk material, said conveyor grate comprising a grate floor having multiple planks forming a grate floor surface, the planks being adjacently situated transverse to the direction of transport on an associated support structure and operationally moved longitudinally relative to one another individually or in groups, with moving gaps situated therebetween which allow cooling air to pass through, wherein mutually facing side edges or side edge regions of two adjacent planks form two essentially mutually complementary profiles between which the moving gap is formed, wherein the moving gaps each have a siphon-like curvature having at least one upwardly directed inlet section, one adjacent downwardly directed intermediate section, and one adjacent upwardly directed outlet section.

18. The conveyor grate according to claim 17, in which the moving gaps emerge at an acute angle a inclined with respect to the grate floor surface.

19. The conveyor grate according to claim 18, in which the acute angle a of the moving gaps is selected such that the exiting cooling air lies against the grate floor surface as a result of the Coanda effect.

20. The conveyor grate according to claim 18, in which the moving gaps have an outlet direction, which extends from the edge of the grate floor toward the middle of the grate floor.

21. The conveyor grate according claim 17, in which the width of the moving gaps is selected and coordinated with the width of the planks in such a way that a narrowing which occurs during thermal expansion of the planks in the transverse direction may continuously be compensated for by increasing the power of cooling air fans.

22. The conveyor grate according claim 17, in which each plank is attached to a side member which supports the plank along its entire length.

23. The conveyor grate according to claim 17, in which the planks are supported on multiple cross members which are successively positioned in the longitudinal direction.

24. The conveyor grate according to claim 17, in which the planks are composed of multiple plank sections which are successively positioned in the longitudinal direction and connected to one another.

25. The conveyor grate according to claim 24, in which the plank sections abut one another via butt joints which slope forward from bottom to top.

26. The conveyor grate according to claim 17, in which the planks are connected via heat-insulating elements to the support structures which support the planks.

27. The conveyor grate according to claim 17, in which the movable support structures which support the planks are borne by wear-free linear guides comprising oscillating torsion bars.

28. A method for cooling a layer of bulk material resting on a conveyor grate, said method comprising:
blowing cooling air through the grate floor, the grate floor being formed by multiple planks adjacently positioned transverse to the direction of transport and operationally moved longitudinally relative to one another, with moving gaps situated therebetween, at least a portion of the cooling air being blown through the moving gaps, wherein the moving gaps each have a siphon-like curvature having at least one upwardly directed inlet section, one adjacent downwardly directed intermediate section, and one adjacent upwardly directed outlet section and wherein at least a quantity of the cooling air is blown through the moving gaps which is sufficient to blow the moving gaps completely open.

29. The method according to claim 28, in which the predominant portion of the entire provided quantity of cooling air is blown through the moving gaps.

30. The method according to claim 29, in which the cooling air introduced through the moving gaps is blown out at an acute angle a inclined with respect to the grate floor surface.

31. The method according to claim 30, in which the cooling air is blown out from each moving gap in each case toward the middle of the grate floor.

* * * * *